(12) United States Patent
Weinrotter et al.

(10) Patent No.: US 8,844,491 B2
(45) Date of Patent: Sep. 30, 2014

(54) LASER SPARK PLUG

(75) Inventors: Martin Weinrotter, Vitoria-Gasteiz (ES); Igor Orlandini, Stuttgart (DE); Werner Herden, Gerlingen (DE); Pascal Woerner, Korntal-Muenchingen (DE); Juergen Raimann, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 62 days.

(21) Appl. No.: 13/510,152

(22) PCT Filed: Sep. 27, 2010

(86) PCT No.: PCT/EP2010/064228
§ 371 (c)(1), (2), (4) Date: Jul. 23, 2012

(87) PCT Pub. No.: WO2011/060987
PCT Pub. Date: May 26, 2011

(65) Prior Publication Data
US 2012/0279469 A1    Nov. 8, 2012

(30) Foreign Application Priority Data

Nov. 23, 2009 (DE) .......... 10 2009 047 021

(51) Int. Cl.
| | |
|---|---|
| F02P 23/04 | (2006.01) |
| F02B 19/04 | (2006.01) |
| F02C 7/264 | (2006.01) |
| F02P 13/00 | (2006.01) |
| F02B 19/12 | (2006.01) |

(52) U.S. Cl.
CPC ................ *F02P 23/04* (2013.01); *F02B 19/04* (2013.01); *F02C 7/264* (2013.01); *Y02T 10/125* (2013.01); *F02P 13/00* (2013.01); *F02B 19/12* (2013.01)
USPC ........ 123/143 B; 123/260; 123/263; 123/266; 123/268; 123/291; 123/293

(58) Field of Classification Search
USPC ...... 123/143 B, 260, 263, 266, 268, 291, 293
See application file for complete search history.

(56) References Cited

U.S. PATENT DOCUMENTS

| | | | |
|---|---|---|---|
| 4,122,805 A | 10/1978 | Kingsbury et al. | |
| 4,434,753 A | 3/1984 | Mukainakano et al. | |

(Continued)

FOREIGN PATENT DOCUMENTS

| | | |
|---|---|---|
| DE | 32 03 874 | 8/1983 |
| DE | 10 2006 018 973 | 10/2007 |

(Continued)

OTHER PUBLICATIONS

International Search Report for PCT/EP2010/064228, dated Dec. 13, 2010.

*Primary Examiner* — Erick Solis
(74) *Attorney, Agent, or Firm* — Kenyon & Kenyon LLP

(57) ABSTRACT

A laser spark plug, e.g., for an internal combustion engine of a motor vehicle or a heavy-duty gas engine, has an antechamber for receiving an ignitable medium and a combustion chamber window which separates the antechamber from a part of the laser spark plug facing away from the combustion chamber. At least one flow-guiding element is provided in the antechamber and is situated in such a way that it deflects a fluid flow, which occurs in the antechamber and moves toward the combustion chamber window, into a radially inner direction.

8 Claims, 1 Drawing Sheet

(56) References Cited

U.S. PATENT DOCUMENTS

| | | | |
|---|---|---|---|
| 4,712,525 A | 12/1987 | Ishida | |
| 5,367,869 A | 11/1994 | DeFreitas | |
| 5,934,244 A * | 8/1999 | Walenta et al. | 123/261 |
| 7,806,094 B2 * | 10/2010 | Gruber | 123/143 B |
| 7,856,956 B2 * | 12/2010 | Inoue et al. | 123/267 |
| 8,375,911 B2 * | 2/2013 | Weinrotter et al. | 123/143 B |
| 8,459,222 B2 * | 6/2013 | Weinrotter et al. | 123/143 B |
| 2009/0107436 A1 | 4/2009 | Schultz | |
| 2009/0159031 A1 * | 6/2009 | Gruber | 123/143 B |
| 2010/0147259 A1 * | 6/2010 | Kuhnert et al. | 123/260 |
| 2011/0297121 A1 * | 12/2011 | Kraus et al. | 123/260 |
| 2012/0060791 A1 * | 3/2012 | Woerner et al. | 123/260 |
| 2012/0304959 A1 * | 12/2012 | Weinrotter et al. | 123/260 |

FOREIGN PATENT DOCUMENTS

| | | |
|---|---|---|
| DE | 10 2007 045 180 | 4/2009 |
| DE | 10 2008 062 573 | 6/2010 |
| EP | 2 072 803 | 6/2009 |
| FR | 2 873 763 | 2/2006 |
| GB | 2 047 802 | 12/1980 |
| JP | 51-16102 | 7/1949 |
| JP | 55-88074 | 12/1953 |
| JP | 56-163426 | 12/1981 |
| JP | 58-162773 | 9/1983 |
| JP | 9-250438 | 9/1997 |
| JP | 5116102 | 1/2013 |
| WO | WO 2010/007066 | 1/2010 |

* cited by examiner

LASER SPARK PLUG

BACKGROUND OF THE INVENTION

1. Field of the Invention

The present invention relates to a laser spark plug, in particular for an internal combustion engine of a motor vehicle or a heavy-duty gas engine, having an antechamber for receiving an ignitable medium and a combustion chamber window which separates the antechamber from the part of the laser spark plug facing away from the combustion chamber.

2. Description of Related Art

A laser spark plug of this type is already known from published German patent application document DE 10 2006 018 973 A1. The disadvantage of the known laser spark plug is the fact that a residual gas blanket made of a combusted air/fuel mixture cannot form or be preserved on a surface area of the combustion chamber window facing the antechamber, the residual gas blanket being capable of contributing to the protection of the combustion chamber window against the continuous input of additional combustion products.

BRIEF SUMMARY OF THE INVENTION

It is thus an object of the present invention to improve a laser spark plug of the type mentioned above in such a way that the formation or preservation of a residual gas blanket in the area of the combustion chamber window is facilitated.

This object is achieved according to the present invention in a laser spark plug of the type mentioned at the outset in that at least one flow-guiding element is provided in the antechamber and is situated in such a way that it deflects a fluid flow, which occurs in the antechamber and moves toward the combustion chamber window, into a radially inner direction. In the sense of the present invention, the indication of the radially inner direction refers to a longitudinal axis or optical axis of the laser spark plug or the antechamber, i.e., the radially inner direction stands essentially perpendicularly on the longitudinal axis of the laser spark plug.

According to studies by the applicant, an effective deflection of the fluid flows moving unimpededly toward the combustion chamber window surface, facing the antechamber, in conventional laser spark plugs is advantageously achieved by providing the flow-guiding element according to the present invention; such fluid flows are created, for example, during a compression stroke, during which an ignitable air/fuel mixture flows into the antechamber of an internal combustion engine containing the laser spark plug.

The deflection of the fluid flow according to the present invention advantageously takes place in such a way that the fluid flow continues into a radially inner area of the antechamber and does not act on a volume region lying directly in the surface area of the combustion chamber window. In this way, during the operation of the laser spark plug, a residual gas blanket may form in this surface area which is not continuously disturbed by the new fluid flows originating in the inside of the antechamber.

A particularly efficient deflection of the fluid flows interfering with the residual gas blanket formation is possible according to the present invention in that the flow-guiding element has a flow-guiding surface which has an essentially concave design. Other variants of the present invention may also provide flow-guiding surfaces which are concave only sectionally, for example, as long as the fluid flow is prevented from directly acting on the combustion chamber window surface or an adjoining volume region.

In another variant of the present invention, a particularly advantageous fluid flow deflection is achieved in that the flow-guiding surface faces an ignition point which is situated in the antechamber and onto which the laser spark plug focuses laser radiation, and/or at least one overflow passage which enables a fluid connection between the antechamber and a combustion chamber. In this way, the fact that fluid flows in the antechamber usually propagate starting from the ignition point or starting from the overflow passage is taken into account.

In another very advantageous specific embodiment of the laser spark plug according to the present invention it is provided that the flow-guiding element is situated directly in the area of the combustion chamber window, thus resulting in additional mechanical protection of the volume region in the area of the combustion chamber window in which the formation of the desired residual gas blanket is intended.

The flow-guiding element is particularly advantageously designed in such a way that it surrounds, together with a surface of the combustion chamber window facing the antechamber, an essentially frustoconical volume region whose base area lies in the area of the combustion chamber window or is formed by a surface of the combustion chamber window. A corresponding cover area of the frustoconical volume region represents here an opening through which the laser radiation passes into the interior of the antechamber.

In another variant of the present invention, a particularly uniform flow deflection according to the present invention is provided in that the flow-guiding element surrounds, in particular concentrically, an optical axis of the laser spark plug.

In another variant of the present invention, a particularly stable configuration is provided if the flow-guiding element is designed as a single piece together with a housing of the laser spark plug.

Another very advantageous specific embodiment of the laser spark plug according to the present invention is characterized in that at least one overflow passage is provided, which enables a fluid connection between the antechamber and a combustion chamber, and that the overflow passage is curved. Due to the nature according to the present invention of the curvature of the overflow passage, in contrast to the overflow passages which are conventionally designed as bore holes, an additional degree of freedom is achieved for the guidance of a fluid flow in the interior of the antechamber, thus advantageously supporting the flow-guiding elements according to the present invention with regard to a desired fluid deflection.

A particularly advantageous fluid guidance in the area of the overflow passages is achieved in that a longitudinal axis of a first section of the overflow passage, which ends in an interior of the antechamber, is at a greater angle to the optical axis of the laser spark plug than a longitudinal axis of a second section of the overflow passage, which ends in an outside area surrounding the antechamber. The first longitudinal axis of the first section of the overflow passage may by all means be at a right angle to the optical axis of the laser spark plug, while the second longitudinal axis of the second section of the overflow passage may be preferably at an acute angle, in particular an angle <20°, to the optical axis of the laser spark plug.

DETAILED DESCRIPTION OF THE INVENTION

Figure 1:
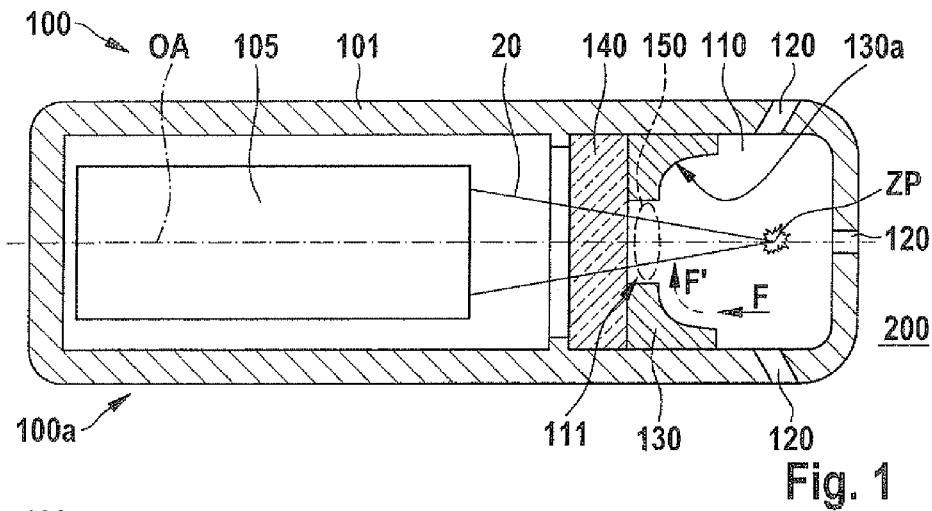
FIG. 1 shows a first specific embodiment of a laser spark plug according to the present invention in a partial cross section.

FIG. 1 shows a partial cross section of a first specific embodiment of a laser spark plug 100 according to the present invention. Laser spark plug 100 has an integrated laser device 105 which may generate laser radiation 20 and focus it onto ignition point ZP lying in an antechamber 110 of laser spark plug 100.

Alternatively, laser spark plug 100 may also be configured in such a way that it is supplied with laser radiation by a remotely situated source (not shown) which it focuses onto the ignition point. In this case, local laser device 105 may be dispensed with.

The interior of antechamber 110 is separated from part 100a of laser spark plug 100, facing away from the combustion chamber, by a combustion chamber window 140.

Laser spark plug 100 or its antechamber 110 further has overflow passages 120 which enable a fluid connection between antechamber 110 and an outside area 200, which may involve a combustion chamber of the internal combustion engine, for example, if laser spark plug 100 is installed in an internal combustion engine.

According to the present invention, laser spark plug 100 further has at least one flow-guiding element 130 which is designed essentially rotation-symmetrically in the present case and is situated in the area of a surface of combustion chamber window 140, facing antechamber 110.

Flow-guiding element 130 advantageously causes a fluid flow F, which is directed toward combustion chamber window 140, to be deflected into a radially inner area or a radially inner direction with regard to the optical axis OA of laser spark plug 100.

Arrow F', which is drawn as a dashed line in FIG. 1, shows the fluid flow deflected according to the present invention.

By deflecting the flow according to the present invention from F to F', a residual gas blanket 150 may advantageously form in volume region 111, the residual gas blanket advantageously protecting the surface of combustion chamber window 140 against contaminants and other undesirable elements, such as those developing during the combustion due to the laser ignition in antechamber 110.

Flow-guiding element 130 preferably has a flow-guiding surface 130a which has an essentially concave design and which advantageously faces ignition point ZP or an overflow passage 120, so that an efficient flow deflection is possible into a radially inner area.

Although flow-guiding element 130 according to the present invention does not necessarily have to adjoin combustion chamber window 140, this advantageously results in the formation of a volume region 111 which is particularly well protected against the flow and which highly reliably allows for the formation and lasting preservation of a residual gas blanket 150.

Figure 2:
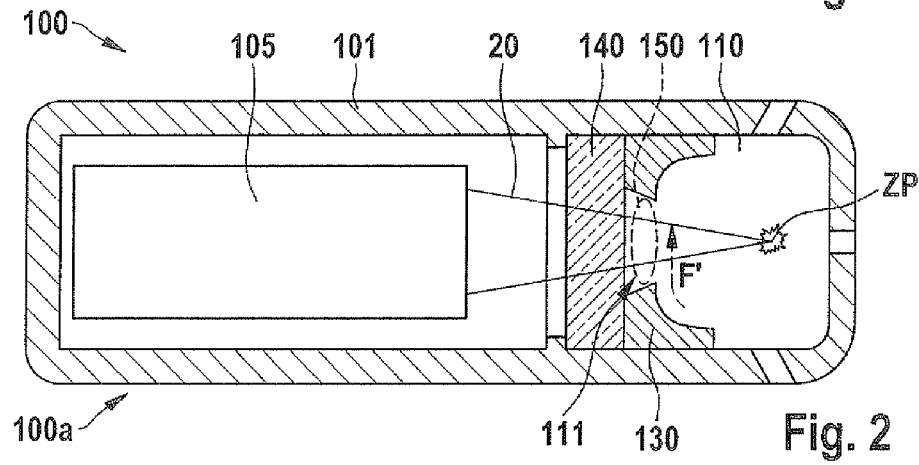
FIG. 2 shows a second specific embodiment of a laser spark plug according to the present invention.

FIG. 2 shows another specific embodiment of laser spark plug 100 according to the present invention.

In contrast to the variant according to the present invention according to FIG. 1, flow-guiding element 130 is here designed in such a way that it surrounds, together with a surface of combustion chamber window 140 facing antechamber 110, an essentially frustoconical volume region 111 whose base area lies in the area of combustion chamber window 140 or is directly formed by a surface of combustion chamber window 140 in the present case. A cover area of frustoconical volume region 111 still allows for an, albeit limited, fluid communication between volume region 111 and the residual volume of antechamber 110 and the transmission of laser radiation 20 onto ignition point ZP.

According to the present invention, a particularly uniform flow guidance or deflection of fluid flow F (FIG. 1) away from combustion chamber window 140 may take place in that flow-guiding element 130 surrounds, in particular concentrically, an optical axis OA of laser spark plug 100.

Flow-guiding element 130 may preferably also be designed as a single piece together with housing 101 of the laser spark plug, whereby a configuration which is particularly mechanically stable is achieved.

Figure 3:
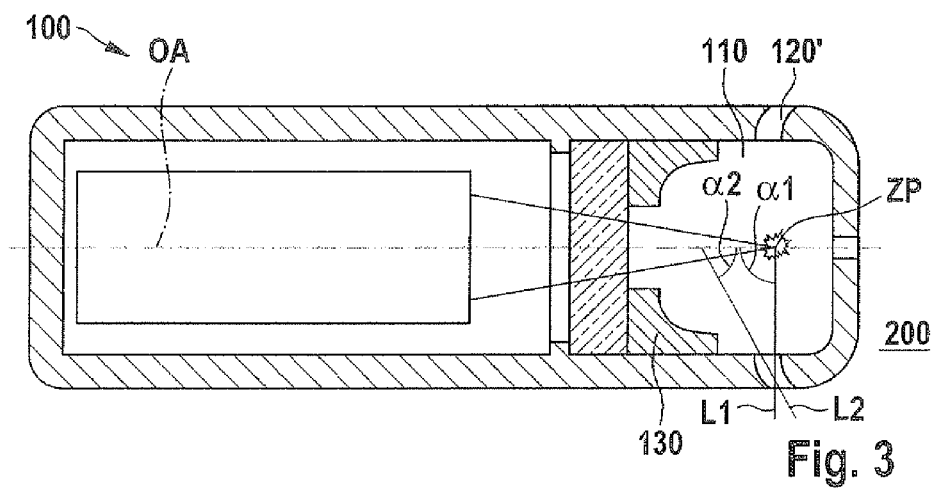
FIG. 3 shows a third specific embodiment of a laser spark plug according to the present invention.

FIG. 3 shows another advantageous specific embodiment of laser spark plug 100 according to the present invention in which lateral overflow passages 120' are curved.

In the present case, a longitudinal axis L1 of a first section of overflow passage 120', which ends in the interior of antechamber 110, is at a greater angle $\alpha 1$ with optical axis OA of laser spark plug 100 than a second longitudinal axis L2 of a second section of overflow passage 120', which ends in an outside area 200 surrounding antechamber 110. Angle $\alpha 2$ between second longitudinal axis L2 and optical axis OA accounts for less than approximately 50°, particularly preferably less than approximately 20°.

This ensures, on the one hand, that an ignitable air/fuel mixture flows directly toward ignition point ZP or at least not directly toward combustion chamber window 140, when the mixture is delivered to antechamber 110 from outside area 200, i.e., the combustion chamber. On the other hand, it is advantageously ensured due to the configuration according to the present invention of second longitudinal axis L2 that ignition torches emanating from antechamber 110, which are used to ignite the mixture present in combustion chamber 200, do not extend purely radially away from antechamber 110 but rather also extend at least to a certain extent in an axial direction with regard to the longitudinal axis or optical axis OA of laser spark plug 100, i.e., propagate to the right in FIG. 3.

According to the present invention, the shaping of curved overflow passages 120' and flow-guiding element 130 takes place in such a way that an optimized flow deflection away from volume region 111 to be protected (FIG. 2) is ensured, while at the same time ignition torches (not shown) may emanate, having a particularly advantageous orientation, from antechamber 110 into combustion chamber 200.

To ensure that the laser ignition itself does not interfere with the formation of residual gas blanket 150 (FIG. 1), ignition point ZP is preferably selected in such a way that it lies outside of volume region 111 to be protected, in particular in a right-hand chamber half of antechamber 110 in FIG. 1.

What is claimed is:

1. A laser spark plug for an engine, comprising:
    an antechamber receiving an ignitable medium;
    a combustion chamber window which separates the antechamber from a part of the laser spark plug facing away from a combustion chamber of the engine; and
    at least one flow-guiding element positioned in the antechamber in such a way that the flow-guiding element deflects a fluid flow, which occurs in the antechamber and moves toward the combustion chamber window, into a radially inner direction;
    wherein the flow-guiding element has an essentially concave flow-guiding surface.

2. The laser spark plug as recited in claim 1, wherein the flow-guiding surface faces at least one of: (i) an ignition point situated in the antechamber, wherein the laser spark plug focuses laser radiation on the ignition point; and (ii) an overflow passage forming a fluid connection passage between the antechamber and the combustion chamber.

3. The laser spark plug as recited in claim 2, wherein the flow-guiding element is situated directly adjacent to the combustion chamber window.

4. The laser spark plug as recited in claim 3, wherein the flow-guiding element and a surface of the combustion chamber window facing the antechamber define an essentially frustoconical volume region whose base area is formed by the surface of the combustion chamber window facing the antechamber.

5. The laser spark plug as recited in claim 3, wherein the flow-guiding element concentrically surrounds an optical axis of the laser spark plug.

6. The laser spark plug as recited in claim 5, wherein the flow-guiding element is configured as an integral portion of a housing of the laser spark plug.

7. The laser spark plug as recited in claim 3, wherein the overflow passage forming the fluid connection passage between the antechamber and the combustion chamber is curved.

8. The laser spark plug as recited in claim 7, wherein a longitudinal axis of a first section of the overflow passage ending in an interior of the antechamber is at a greater angle to the optical axis of the laser spark plug than a longitudinal axis of a second section of the overflow passage ending in an outside area surrounding the antechamber.

* * * * *